Figure 1:
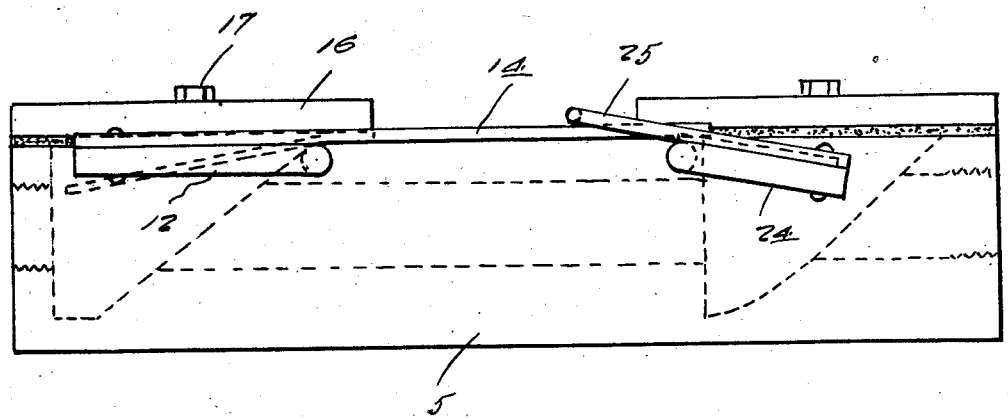

May 19, 1931.    I. D. SMITH    1,805,603
AUTOMATIC CHECK VALVE
Filed April 17, 1930    2 Sheets-Sheet 1

Inventor
Ira D. Smith
By Clarence A. O'Brien
Attorney

May 19, 1931.  I. D. SMITH  1,805,603
AUTOMATIC CHECK VALVE
Filed April 17, 1930   2 Sheets-Sheet 2
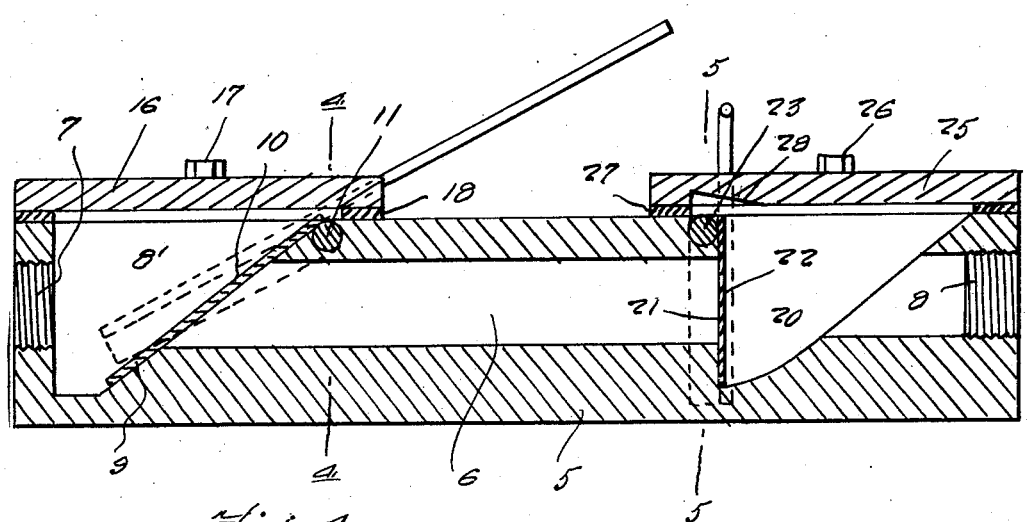
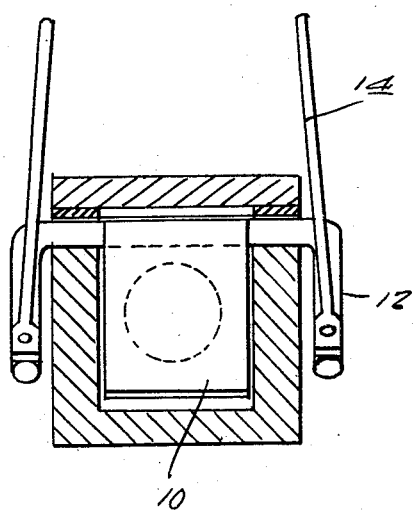
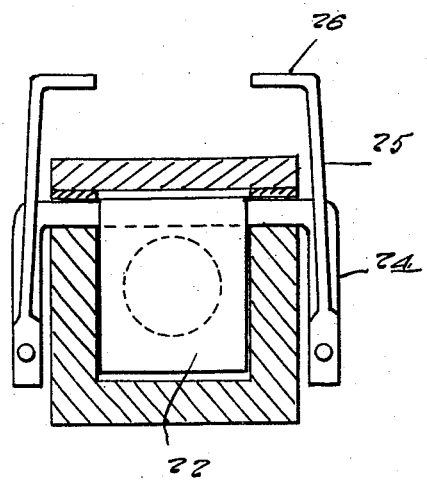
Inventor
Ira D. Smith
By Clarence A. O'Brien
Attorney Patented May 19, 1931

1,805,603

UNITED STATES PATENT OFFICE

IRA D. SMITH, OF EASTLAND, TEXAS

AUTOMATIC CHECK VALVE

Application filed April 17, 1930. Serial No. 445,017.

The present invention relates to an automatic check valve particularly designed for use in a natural gas line so as to shut off the gas whenever the pressure ceases which occurs due to freezing and also other causes.

An important object of the invention resides in the provision of a valve of this nature which is exceedingly simple in its construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
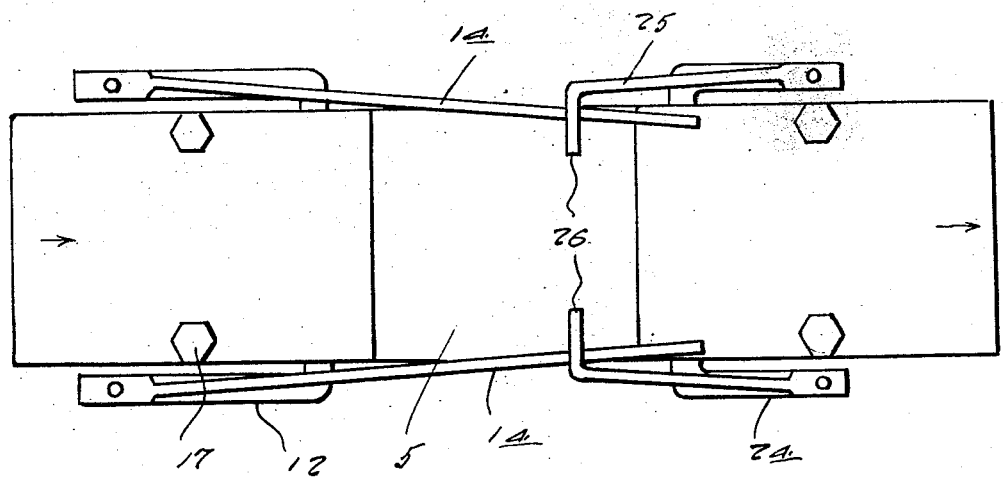

In the drawings:

Figure 1 is a side elevation of the valve embodying the features of my invention, Figure 2 is a top plan view thereof, Figure 3 is a longitudinal vertical section therethrough, Figure 4 is a vertical transverse section taken substantially on the line 4—4 of Figure 3, and Figure 5 is a vertical transverse section taken substantially on the line 5—5 of Figure 3.

Referring to the drawings in detail it will be seen that the numeral 5 denotes an elongated body having a longitudinally extending bore 6 therein. Numeral 7 denotes a threaded inlet and numeral 8 denotes a threaded outlet so that the gas pipe line may be connected with the valve.

In the inlet end of the body there is formed a recess in communication with the bore 6 and the inlet 7 having a slanting seat 9 against which gravitates a flap valve 10 mounted on a shaft 11 journalled in the upper portion of the body and terminating at its ends outside the body in cranks 12 to which are secured rods 14 projecting in opposite directions therefrom.

These cranks 12 are extended in somewhat the same direction as the flap valve 10 to assist in its gravitation. A cap 16 is detachably secured at 17 on the body over the recess 8' and a gasket 18 is interposed between the body and the cap plate 16.

A recess 20 is formed at the outlet end of the body across the bore 6 and has a vertical valve seat 21 remote from the outlet end against which is adapted to swing a flap valve 22 on a shaft 23 journalled in the upper portion of the body 6 and being formed with depending cranks 24 at its ends to which are attached upstanding rods 25 having inturned fingers 26.

Now by swinging down the rods 24 the inturned fingers 26 may be engaged over the rods 24 thereby holding both flap valves in an open position as the pressure of the gas tends to swing the flap valve 22 to the position shown in Figure 1 causing the fingers 26 to bear down on the rods 14 and maintaining the flap valve 10 in an open position.

However should the pressure cease then the valve 22 will swing to a closed position releasing the fingers 26 from the rods 14 so that the flap valve 10 will gravitate downwardly to a closed position and of course then the gas is shut off even though the pressure should come up again.

In this way asphyxiation by lights going out and the like is eliminated.

It is thought that the construction, operation, utility and advantages of this invention will be thoroughly understood without a more detailed description thereof.

It is preferable to provide a cap plate 25 over the recess 20 and to be detachably held in place by suitable means 26 and a gasket 27 should be interposed between the cap plate 25 and the body. This cap plate on its under face is cut away as at 28 to accommodate the swinging movement of the valve 22 to an open position.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A safety valve of the class described including a body having a bore extending therethrough with flat valves one of which closes in the direction of the flow through the bore and the other closes in the opposite direction, and means on the second valve for engaging means on the first valve to hold the first valve open when the pressure of the flow is sufficient to swing the second valve to an open position.

2. A device of the class described comprising a body having a bore therein, a recess at one end of the bore, a recess at the other end of the bore, the first mentioned recess being formed with a slanting valve seat, a flap valve closable thereagainst, a shaft rockable in the body to which the flap valve is attached, the second recess having a vertical valve seat, a flap valve closable thereagainst, a shaft to which the second flap valve is attached, said shaft having cranks, rods extending from the crank, the rods associated with the second flap valve having inturned fingers to engage the rods of the first mentioned flap valves.

In testimony whereof I affix my signature.

IRA D. SMITH.